(12) United States Patent
Madonna et al.

(10) Patent No.: US 8,237,625 B2
(45) Date of Patent: Aug. 7, 2012

(54) MULTIMEDIA CONTROL AND DISTRIBUTION ARCHITECTURE

(75) Inventors: Robert P. Madonna, Osterville, MA (US); James F. Allen, Sandwich, MA (US); Peter Bennett, Brewster, MA (US); David M. Benvenuti, Osterville, MA (US); Kevin C. Kicklighter, Centerville, MA (US)

(73) Assignee: Savant Systems, LLC, Hyannis, MA (US)

( * ) Notice: Subject to any disclaimer, the term of this patent is extended or adjusted under 35 U.S.C. 154(b) by 1003 days.

(21) Appl. No.: 12/204,275

(22) Filed: Sep. 4, 2008

(65) Prior Publication Data
US 2009/0083634 A1    Mar. 26, 2009

Related U.S. Application Data

(60) Provisional application No. 60/970,166, filed on Sep. 5, 2007.

(51) Int. Cl.
*G09G 5/00* (2006.01)

(52) U.S. Cl. ............................ 345/2.1; 345/173; 715/788

(58) Field of Classification Search .................... 345/1.2, 345/2.1, 173, 179; 715/733, 771, 788, 700
See application file for complete search history.

(56) References Cited

U.S. PATENT DOCUMENTS

| | | | |
|---|---|---|---|
| 4,953,011 A | 8/1990 | Mori et al. | |
| 5,065,143 A | 11/1991 | Greaves et al. | |
| 5,488,675 A | 1/1996 | Hanna | |
| 5,566,251 A | 10/1996 | Hanna et al. | |
| 5,581,629 A | 12/1996 | Hanna et al. | |
| 5,606,345 A * | 2/1997 | Truchet | 715/788 |
| 5,766,074 A * | 6/1998 | Cannon et al. | 463/16 |
| 5,923,791 A | 7/1999 | Hanna et al. | |
| 6,058,288 A | 5/2000 | Reed et al. | |

(Continued)

FOREIGN PATENT DOCUMENTS

WO    WO-02/052540 A1    7/2002

OTHER PUBLICATIONS

"Notification of Transmittal of the International Search Report and the Written Opinion of the International Searching Authority, or the Declaration" for International Application No. PCT/US2008/010375, filed on Sep. 4, 2008, mailing date Dec. 30, 2008, 13 pages.

*Primary Examiner* — Kimnhung Nguyen (74) *Attorney, Agent, or Firm* — Cesari and McKenna, LLP (57) ABSTRACT

In one embodiment, a multimedia control and distribution architecture is provided. A media server/controller generates a plurality of graphics signals, each graphics signal including a separate user interface to be displayed on a particular device, such as a touch screen unit. A universal extender (UVX) coupled to the media server/controller converts and extends the graphics signals for transmission on a plurality of universal transmission pathways. Each of the plurality of devices receives a graphic signal passed thereto, displays graphics embodied in the graphics signals, and accept user input in response to the graphics signal. For example, the one or more touch screen units may accept a user touch and pass a location of the user touch back on a universal transmission pathway to the UVX, for transmission to the media server/controller. The media server/controller generates control commands and provides the control commands.

24 Claims, 6 Drawing Sheets

U.S. PATENT DOCUMENTS

| | | |
|---|---|---|
| 6,377,228 B1 | 4/2002 | Jenkin et al. |
| 6,446,130 B1 | 9/2002 | Grapes |
| 2001/0006375 A1 | 7/2001 | Tomooka et al. |
| 2003/0169234 A1 | 9/2003 | Kempisty |
| 2003/0184553 A1 | 10/2003 | Dawson |
| 2004/0085480 A1 | 5/2004 | Salzer et al. |
| 2004/0183949 A1 | 9/2004 | Lundberg et al. |
| 2004/0229693 A1* | 11/2004 | Lind et al. .................. 463/37 |
| 2004/0233333 A1 | 11/2004 | Chiu et al. |
| 2005/0134739 A1 | 6/2005 | Bian |
| 2006/0028398 A1 | 2/2006 | Willmore |
| 2006/0077120 A1 | 4/2006 | Domi et al. |
| 2007/0142022 A1 | 6/2007 | Madonna et al. |
| 2007/0143801 A1 | 6/2007 | Madonna et al. |
| 2007/0150364 A1* | 6/2007 | Monaghan et al. ............ 705/26 |
| 2008/0225008 A1 | 9/2008 | Madonna et al. |

* cited by examiner

MULTIMEDIA CONTROL AND DISTRIBUTION ARCHITECTURE

RELATED APPLICATIONS

This Application claims priority to U.S. Provisional Application No. 60/970,166, by Robert P. Madonna et al., filed on Sep. 5, 2007, and titled "Multimedia Control and Distribution Architecture." Such Provisional Application is further incorporated herein by reference.

BACKGROUND

1. Technical Field

The present invention relates generally to multimedia control and distribution architectures and more specifically to architectures for driving and receiving data from multiple touch screen and/or other types of devices as well as for providing on-screen displays (OSDs).

2. Background Information

As electronic systems become more complicated, the limitations of traditional control schemes are becoming increasingly apparent. To partially address this issue, many systems now interoperate with touch screen units that include touch sensitive liquid crystal displays (LCDs) to display menus, selectable icons, status information and/or other graphics. Such touch screens units are generally special-purpose devices, dedicated to implementing control and interface functionality. Often, touch screen units are configured to be located some distance from the rest of the system, and thereby operate as remote controls for the system.

For example, many audio/video (A/V) systems and home control/automation systems employ wall-mounted, table-top, or hand held touch screen units to control the system. While the use of these touch screen units often improves the user experience, they are generally quite complex and accordingly quite costly. The high cost of conventional touch screen units has limited their use, such that only very high-end systems typically employ a large number of touch screen units. Much of the complexity and cost of conventional touch screen units is due to the typical inclusion of a general-purpose computer in each touch screen unit. In conventional configurations, a general-purpose computer is often needed to received a non-graphics data signal from an external device and, in response thereto, generate a graphics signal to drive the LCD of the touch screen unit. Further, in many conventional configurations, the general-purpose computer is also needed to process touch location information received by a touch sensor of the touch screen unit, and convert this information into high-level commands that control the overall system. Accordingly, significant processing power is required at a conventional touch screen unit, leading to undesirable complexity and cost.

Further, touch screen units of conventional systems generally interface with an A/V and/or home control/automation system over dedicated interfaces or other types of special interconnections. Such an arrangement limits the flexibility and expandability of conventional systems. For instance, a user may desire to use other types of display and/or interface devices, in addition to, or rather than, touch screen units. For example, a user may desire to use a combination of a non-touch sensitive display screen, and a separate interface device, such as a button-centric handheld remote control, to make selections. Oftentimes conventional systems do not provide for such alternate means of control absent significant system modification. At the very least, conventional systems generally require differing types of interfaces or other interconnections to be used to implement such a configuration. That is, the interfaces and/or cabling used for a touch screen unit often may not be simply be interconnected to differing types of devices; other different interfaces and/or cabling are typically needed. This leads to increased system configuration and cabling expense, decreased flexibility for future system modifications, and a host of other shortcomings.

Further, conventional systems may implement some type of on-screen display (OSD) in which controls or indicators are displayed on a display device, for example, a monitor or television, while video images are also being displayed. For example, a very simple OSD may display channel numbers and volume settings in a portion of a display, while video images are being displayed in other portions of the display.

However, traditional OSDs suffer a number of shortcomings. Content of traditional OSDs are typically limited to only a very specific set of text and symbols, for example, to only a predefined set of text fonts and sizes, or only certain symbols loaded in a library. The text and symbols often must be formatted in a very particular manner, and commonly are of very limited detail. Further, the text and symbols generally must either replace the entire video image, i.e., forming a full-screen OSD that obscures the video image completely, or be displayed in limited, predefined regions over the video image, for example, be displayed in a certain corner, while video images occupy the remainder of the display. These requirements may be quite undesirable and limiting.

Accordingly, there is a need for an improved system and method that addresses the shortcoming of conventional multimedia control and distribution architectures, and provides for the use of multiple touch screen and other display and/or interface devices in a more efficient manner and/or provides for improved mixing of graphics with video for OSDs.

SUMMARY

In one embodiment, a novel multimedia control and distribution architecture permits graphics signal generation, processing of touch location information, processing of key press information, and other high-level processing functions for touch screen units and/or other devices to be performed at a centralized location. In such manner, the touch screen units and certain devices may have reduced processing capabilities, thus reducing their complexity and cost. The novel multimedia architecture may further permit a graphics signal including on-screen display (OSD) graphics to be generated at a central location. The graphics signal may be distributed to a remote location, and combined at the remote location with a video signal, for example a full-motion video signal. In this manner, a high quality OSD may be created where OSD graphics are overlaid onto video frames that are thereafter presented to a user on a display device.

More specifically, the novel architecture may include a media server/controller that receives, stores, and serves a variety of different types of multimedia content. The media server/controller is configured to output a plurality of separate graphics signals for eventual display on one or more touch screen units or other types of devices. The media server/control may further provide bidirectional data links. These links may be configured to pass control information, as well as a plurality of separate audio streams.

The graphics signal pathways and the data links may be coupled to a novel Universal Extender (UVX). The UVX includes circuitry to allow the media server/controller to drive, and to receive information from, a plurality of touch screen units or other type of devices that may be located quite remote from media server/controller. The UVX may include graphics signal format conversion and extension functionality, data/audio signal switching and extension functionality, as well as certain processing functionality. In some configurations, the UVX may extend Digital Visual Interface (DVI) signals and/or analog Video Graphics Array (VGA) graphics signals, as well as IEEE 1394 (i.e., Firewire®) and/or Universal Serial Bus (USB) data signals.

The UVX may be coupled to a plurality of universal transmission paths that each lead to a touch panel unit or any of a variety of other types of devices that may be coupled to the UVX in this novel architecture. The use of universal transmission paths reduces the need for special cabling for each type of device and increases system flexibility.

At least some of the universal transmission paths may be coupled to touch screen units that do not include a general-purpose computer. That is, each touch screen unit may only include circuitry to display a received graphics signal on a screen and to a capture x-axis and y-axis coordinates corresponding to the location of a touch on a touch panel overlaid upon the screen. These coordinates may be passed back via the universal transmission paths to the UVX for eventual passage to the media server/controller where they may be interpreted and used to generate appropriate high-level control commands that are provided to devices to be controlled, and/or provided for use internal to the media server/controller.

Further the UVX may be coupled to one or more novel on-screen display (OSD) processing units that may combine a graphics signals including graphics representing OSD content with a full-motion video signal, to overlay an OSD onto the frames of the video signal. An OSD processing unit may receive the graphics signal as well as a data signal from the media server/controller. The OSD processing unit may receive the video signal from a local video source or a remote video source. A video processor and a video mixer of the OSD processing unit may then implement a novel color keying technique for mixing graphics with video images. In this manner, video images including an OSD may be generated for presentation to a user on a display device.

BRIEF DESCRIPTION OF THE DRAWINGS

The detailed description of example embodiments below refers to the accompanying drawings, of which.

DETAILED DESCRIPTION OF EXAMPLE EMBODIMENTS

Figure 1:
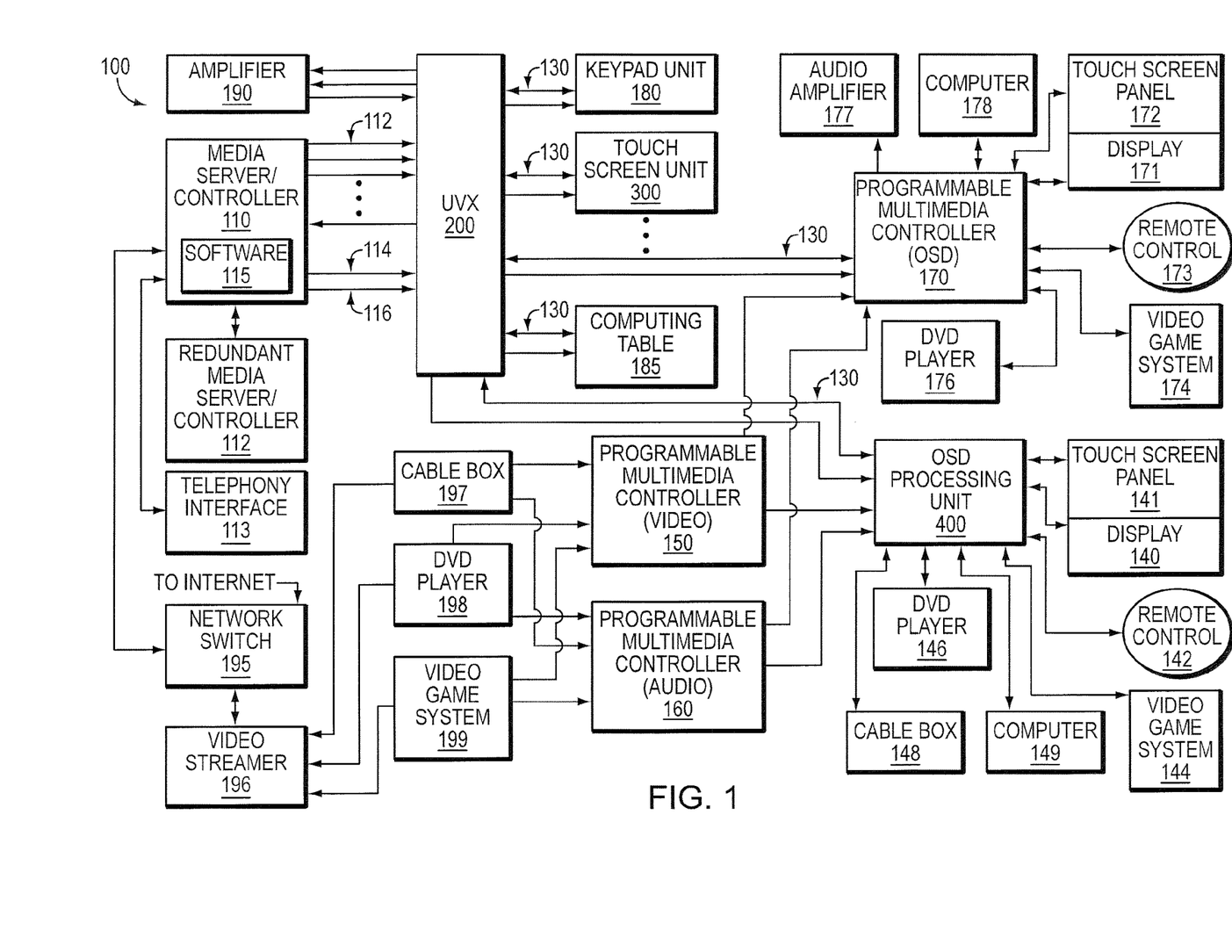
FIG. 1 is block diagram of an example architecture of a multimedia control system that that drives and receives data from multiple touch screen units and other devices.

FIG. 1 is block diagram of an example architecture 100 of a multimedia control system that that drives and receives data from multiple touch screen units 300 and other devices. Such an architecture permits graphics signal generation, processing of touch location information, processing of key press information, and other high-level processing for a plurality of touch screen units 300, and/or other devices, to be performed at a centralized location, i.e., at a multi-function media server/controller 110. In such manner, the touch screen units 300 and certain other devices may have reduced processing capabilities, thus reducing their complexity and cost. Further, the system may be readily upgraded as the speed and capabilities of computing circuitry increases, as the media server/controller 110 may be replaced absent significant modification to touch screen units 300 and other devices interconnected thereto.

The media server/controller 110 may be a multi-function device capable of interacting with touch screen units 300, and other devices, to receive information from the devices, provide content to the devices, and/or direct the devices to perform certain operations. The media server/controller 110 may receive, store, and serve a variety of different types of multimedia content, for example music, full-motion video, still-images, text, webpages and/or other types of multimedia content. Such multimedia content may be manually loaded onto the media server/control 110, for example, from portable media such as compact discs (CDs), Digital Video Discs (DVDs), flash memory, and/or other types of portable media, may be downloaded from the Internet, for example, via a network switch 195, or may be supplied as streaming media from a video streamer 196 that is coupled to one or more multimedia content sources, for example, a cable box 197, a DVD player 198, a video game system 199, or any of a variety of other content sources. The media server/controller 110 may also provide a variety of interactive "services," some of which may utilize connectivity to the Internet via the network switch 195 and/or connectivity to a telephone network via telephony interface 113. A description of example services that may be provided is set forth in U.S. patent application Ser. No. 11/314,112 by Robert P. Madonna et al., entitled "Programmable Multimedia Controller with Programmable Services," which is incorporated by reference herein.

In one embodiment, the media server/controller 110 is a stand-alone general-purpose computer executing media serving and control software 115. As used herein, the term general-purpose computer refers to a device that is configured to execute a set of software instructions, and, depending upon the particular software instructions, may perform a variety of different functions or tasks. Typically, but not always, a general-purpose computer executes a general-purpose operating system, such as the OS X® operating system, available from Apple Inc., the Windows® operating system, available from Microsoft Corporation, the Linux® operating system, available from a variety of vendors, or another operating system. The media serving and control software 115 may execute "on top of" the operating system, or may be integrated into the operating system to some extent.

In another embodiment, the media server/controller 110 may be a special-purpose hardware device. In such an embodiment, the media server/controller 110 may include a plurality of Application Specific Integrated Circuits (ASICs), and other task-specific circuitry, to receive user selections, store and serve multimedia content, offer interactive services, directing devices to perform certain operations, as well as to perform other functions.

The media server/controller 110 is configured to output a plurality of separate graphics signals, for example Digital Visual Interface (DVI) signals or analog Video Graphics Array (VGA) signals, for eventual display on one or more touch screen units 300 or other types of devices. The graphics signals may include graphics representing a user interface to be displayed on the screen units 300 or other types of devices, and/or some other content to be displayed. The graphics signals may each be generated by individual graphics cards arranged in the media server/controller 110 and propagated on separate signal pathways 112. For example, in one configuration, the media server/controller 110 may include eight individual graphics cards for outputting eight separate graphics signals. Alternately, two or more graphics signals may be generated by a single graphics card, for example by dual-head graphics card. In one configuration, the media server/controller 110 may include four individual graphics cards each of which outputs two separate graphics signals. Further, while in some embodiments the graphics signals may each be passed on an individual signal pathway, in some alternate configurations two or more graphics signals may be multiplexed or otherwise combined onto a single signal pathway.

The media server/control 110 may further provide bidirectional data links, for example an IEEE 1394 (i.e., Firewire®) link 114 and a Universal Serial Bus (USB) link 116. These links may be configured to pass control information, as well as a plurality of separate audio streams. The audio streams may be related to the graphics signals, for example, may be the audio component of a movie, audio effects to accompany a user interface embodied in the graphics signals, or some other related audio. Alternately the audio streams may be unrelated to the graphics signals, for example may be a music stream for separate playback or another type of unrelated audio. In one example configuration, the IEEE 1394 link 114 may be configured to simultaneously pass sixteen separate high-quality audio streams, that may be grouped in a variety of ways. For example, the audio streams may be grouped into eight 2-channel stereo streams for playback in eight different zones, two 7.1 channel streams for playback in two different zones, or any of a variety of other groupings. Additional audio may be passed on the USB link 116. For example, the USB link 116 may be configured to pass a plurality of audio streams that include sound effects or other audio that may be used by touch screen units 300 or passed to other devices.

Further, it should be remembered that the data links 114, 116 are bi-directional and thus data, including audio, may pass in both directions. For example, control information may be passed back to the media server/controller 110. Similarly, audio may be passed back to the media server/controller 110. For example, audio originating at a touch screen unit 300 may be passed back to the media server/controller 110 for use in a telephony application, to be recorded, to be used for voice-activated control, or to be used for any of a variety of other purposes.

The graphics signal pathways 112 and data links 114, 116 are coupled to a novel Universal Extender (UVX) 200. As discussed in more detail below, the UVX 200 includes circuitry to allow the media server/controller 110 to drive, and to receive information back from, a plurality of touch screen units 300, or other type of devices (for example interface and display devices) that may be located quite remote from the media server/controller 110. The UVX 200 may provide graphics signal format conversion and extension functionality, data/audio signal switching and extension functionality, as well as certain processing functionality.

The UVX 200 is coupled to a plurality of universal transmission paths 130 that each lead to a touch screen unit 300 or any of a variety of other types of devices that may be coupled to the UVX in this novel architecture 100. The use of universal transmission paths 130 for a variety of different devices reduces the need for special cabling for each type of device and increases system flexibility, allowing for simplified modifications and additions of additional devices. That is, in contrast with many conventional systems which utilize differing interfaces and cabling for different types of devices, the universal transmission paths 130 may be used with a wide variety of different devices that may operate within the architecture 100.

In one embodiment, each universal transmission path 130 includes two Category 5 (CAT5) cables. One CAT5 cable supports graphics signals (for example VGA over CAT5 or DVI over CAT5) over the other supports bidirectional data signals (for example, USB over CAT5). In such a configuration, electrical power may also be transmitted over one or both of the cables, for example using Power over Ethernet (POE) technology. Use of CAT5 cables may allow transmission over significant distances, for example in one configuration, transmission may occur to devices located as great as 300 feet away from the UVX 200. Alternately, a variety of other types of transmission paths may be employed, including other types of wired paths, for example, USB and IEEE 1394, or wireless paths, for example, Radio Frequency (RF) or WI-FI.

At least some of the universal transmission paths 130 may be coupled to touch screen units 300 that do not include a general-purpose computer. That is, the touch screen units 300 do not include the advanced processing capabilities needed to generate a graphics signal from a non-graphics data signal, to interrelate user touch locations with displayed icons, options or other content, and to generate appropriate high-level commands therefrom. Instead, using the techniques described herein, such advanced processing may be performed by the central media server/controller 110.

Each touch screen unit 300 may only include circuitry to display a received graphics signal on a LCD screen and to a capture x-axis and y-axis coordinates corresponding to the location of a touch on a touch panel overlaid upon the LCD screen. These coordinates may be passed back via the universal transmission paths 130 to the UVX 200 for eventual passage to the media server/controller 110 where they may be interpreted and used to generate appropriate high-level control commands that are provided to devices to be controlled, and/or provided for use internal to the media server/controller 110. Further details regarding the touch screen units 300, and their operation, may be found below in reference to FIG. 3.

In addition to the touch screen units 300, the universal transmission paths 130 may be coupled to other types of devices, for example display and/or interface devices. For example, a path may be coupled to a novel on-screen display (OSD) processing unit 400. The OSD processing unit 400 may combine a graphics signal including OSD graphics originating from the media server/controller 110, or another device, with a full-motion video signal originating from a local video source or a remote video source, to overlay an OSD onto the frames of the video signal. The OSD may be overlaid in any desired display region and be presented with a variety of different "special effects," for example fade effects, blending effects, etc. In this manner, a high quality OSD may be presented to the user on a display 140, for example a television. The user may select from options, icons or other content presented in the OSD, for example via a remote control unit 142 or touch screen panel 141 overlaid on the display device. In this manner, the OSD may be used for system control and other functions. Further details regarding the operation of the OSD processing unit 400 are described below in reference to FIGS. 4A and 4B.

It should be remembered that, the graphics signal including the OSD graphics may originate from a device other than the media server/controller 110. For example, in one configuration, the graphics signal may originate from a programmable multimedia controller 150 configured with a video switch, and at least a video input module and a video output module. Further details regarding a programmable multimedia controller, and its configuration in this manner, are found in U.S. patent application Ser. No. 11/314,644 by Robert P. Madonna et al, entitled "System and Method for a Programmable Multimedia Controller" which is incorporated by reference herein.

The OSD processing unit 400 may further interface with a variety of other devices, for example, a video game system 144, a DVD player 146, a cable television box 148, a computer 149, a programmable multimedia controller 150 configured with a video switch and at least a video input module and a video output module, a programmable multimedia controller 160 configured with an audio switch and at least an audio input module and an audio output module, or any of a variety of other devices. In some cases, the video signal on which the OSD is overlaid may originate from these devices. In other cases the devices may pass information through the OSD processing unit 400, back via the transmission paths 130, to the UVX 200 for eventual passage to the media server/controller 110.

Universal transmission paths 130 may also be coupled to a programmable multi-media controller 170 configured with at least an audio output module and an audio input/video output module. A programmable multimedia controller 170 configured in this manner may be programmed to combine a graphics signals including OSD graphics with a video signal to present an OSD, similar to an OSD processing unit 400. Further details regarding such a device are found in U.S. patent application Ser. No. 11/687,511 by Robert P. Madonna et al., entitled "System and Method for Mixing Graphics with Video Images or Other Content," which is incorporated by reference herein.

In addition, the programmable multimedia controller 170 may be programmed to process surround sound and other audio formats and may interface with a variety of other devices, for example, with a display 171, such as a television, a touch screen panel 172 overlaid on the display 171, a remote control unit 173, a video game system 174, a DVD player 176, an audio amplifier 177, a computer 178, programmable multimedia controllers 150,160, or any of a number of other types of devices. In some cases, information from these devices may be passed back via the universal transmission paths 130 to the UVX 200, for eventual passage to the media server/controller 110, or to another device.

Further, universal transmission paths 130 may be coupled to a keypad unit 180 including one or more buttons. While in some configurations, the keypad unit 180 may include an integrated display screen, in other configurations no display may be provided. Of note, the keypad unit 180 need not include a general-purpose computer for processing button presses, relating the presses to system functions, and issuing appropriate high-level control commands to implement the functions. Such advanced functionality may be instead be provided by the media server/controller 110, thus reducing the complexity and cost of a keypad unit 180. The keypad unit 180 may simply include circuitry to transmit the identity of the particular button pressed, for example a button number or other code.

In some configurations, a keypad unit 180 may programmable via a novel programming technique that allows a user to associate functions and/or services with various keys using a special graphical programming environment. The keypad unit 180 is assigned a unique identifier (UID) that permits it to be specifically identified. The user then accesses a component profile, or a plurality of component profiles, associated the keypad unit 180. Using a graphics software package, for example the Adobe Photoshop® graphics software package, the user may associate functions and/or services with one or more keys of the keypad by manipulating graphical icons. Thereafter, the keypad unit 180 may be used for system control and other application. A further description of techniques that may be used to program a keypad unit 180 is set forth in U.S. patent application Ser. No. 11/687,458 by Robert P. Madonna et al., entitled "Programmable On Screen Display and Remote Control," which is incorporated by reference herein.

In addition, universal transmission paths 130 may be coupled to a "computing table" 185 that includes a LCD or other display and a touch screen panel integrated into a table-top. A user may interact with the computing table 185 by touching or dragging their fingertips about the table-top. In some configurations, a user may further interact with the computing table 185 by bringing real-world objects into proximity with the table top. Unlike many touch screen devices, the computing table 185 may be configured to respond to more than one simultaneous touch on the table-top. The computing table 185 may be a general-purpose computing table, or a special-purpose computing table configured with special functionality for audio, video, telephony, home control and/or other types of applications.

Finally in addition to couplings via the universal transmission paths 130, the UVX 200 may be couple to other devices, for example an audio amplifier 190, via a number of audio and control connections. Thus, a wide range of additional connection arrangements and options are expressly contemplated.

Figure 2:
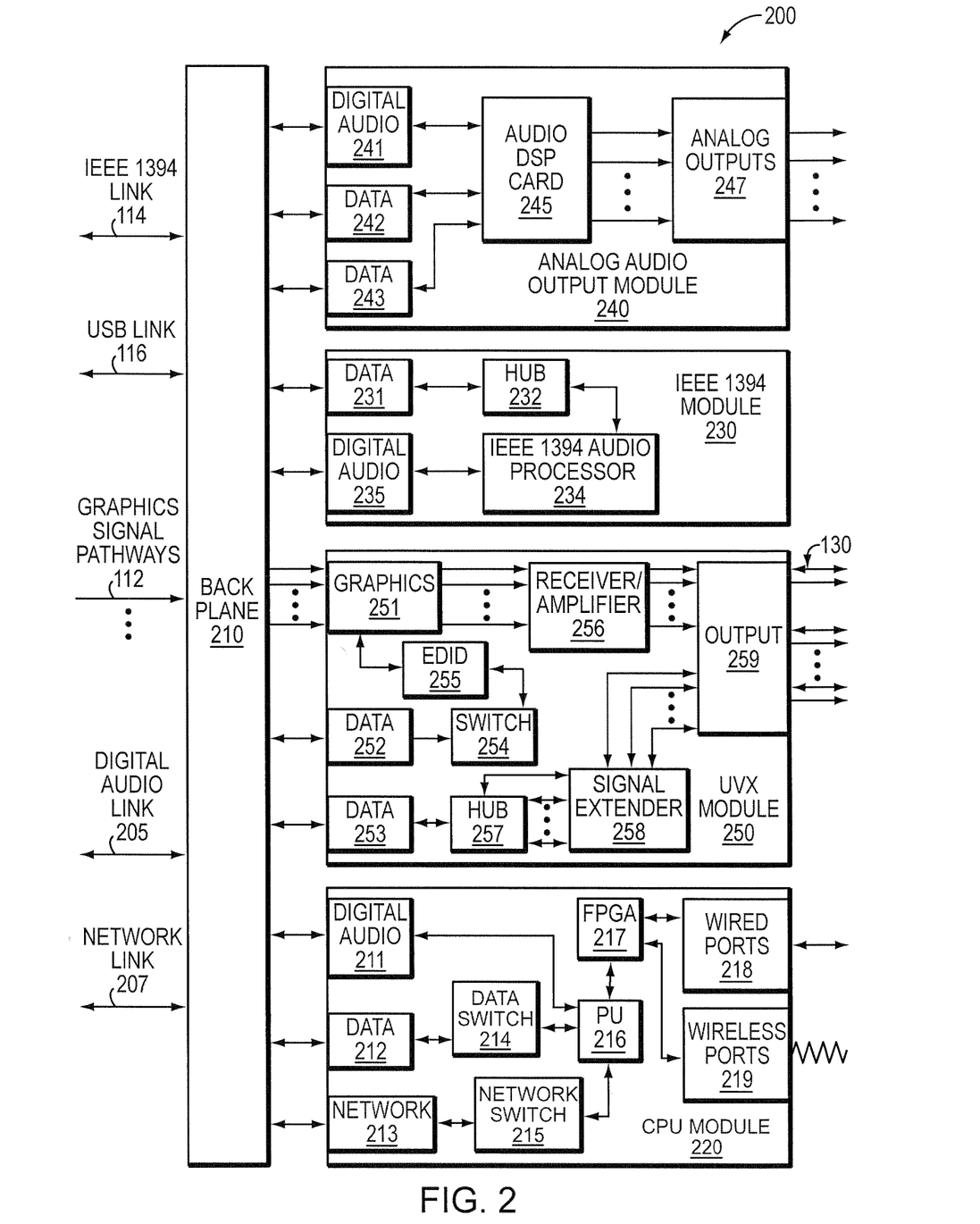
FIG. 2 is a block diagram of an example Universal Extender (UVX) that may be used in the architecture of FIG. 1.

FIG. 2 is a high-level block diagram of an example Universal Extender (UVX) 200 that may be used in the architecture 100 of FIG. 1. As discussed above, the UVX 200 may be coupled to the media server/control 110 via data/audio links, such as an IEEE 1394 (i.e., Firewire®) link 114 and a Universal Serial Bus (USB) link 116, as well as a plurality of graphics signal pathways 112, for example DVI or VGA links. The UVX may further receive digital audio signals via one or more dedicated digital audio links 205, and may be coupled to a local area network, wide area network, or other network providing Internet connectivity via a network link 207. The links 112, 114, 116, 205, 207 are coupled to a backplane 210 of the UVX 200, which may perform a variety of data transfer functions. In some embodiments, the backplane 210 may include a digital audio switch (not shown) that may permit efficient switching of digital audio streams. The backplane 210 may be coupled to a plurality of modules which perform certain aspects of the functionality of the UVX 200. For example, a CPU module 220, an IEEE 1394 module 230, an analog audio output module 240, and a UVX module 250 may be present.

The CPU module 220 may control and otherwise manage the operation of the UVX 200. The CPU module 220 may be coupled to the backplane 210 via a number of connections, for example, a digital audio connection 211, such as a TOShiba LINK (TOSLINK) connection, a data bus connection 212, such as an Inter-Integrated Circuit (I2C) bus connection, and a network connection 213, such as an Ethernet link. Control data may be switched by a data switch 214, for example an I2C switch, and network packets switched by a network switch 215, for example an Ethernet switch. A processing unit (PU) 216 may be coupled to the switches 214, 215. In one embodiment the processing unit is a Reduced Instruction Set (RISC) Freescale ColdFire® microprocessor, though a variety of other microprocessors may alternately be employed. The PU 216 may interface with a field programmable gate array (FPGA) 217 that supports a plurality of wired control ports 218, for example serial control ports, and wireless control ports 219, for example infra-red (IR) links. Such ports may be used to pass control commands to certain devices, for example to pass commands to the interconnected audio amplifier 190 discussed above.

The IEEE 1394 module 230 may manage the transmission and reception of multiple audio streams over IEEE 1394 connections. As discussed above, an IEEE 1394 interface may be configured to simultaneously pass multiple separate high-quality audio streams, that may be grouped in a variety of ways. For example, the audio streams may be grouped into multiple 2-channel streams, multiple 7.1 channel streams, etc. The IEEE 1394 module 230 may receive IEEE 1394 signals via a data connection 231, pass these signals to an IEEE 1394 hub 232 and thereafter to an IEEE 1394 audio processor 234, for example an Oxford Audio FireWire® audio processor. The IEEE 1394 audio processor 234 may then output decoded audio signals on digital audio connections 235. Alternately, the IEEE 1394 audio processor 234 may receive audio on the digital audio connections 235 and produce IEEE 1394 compliant audio signals therefrom.

The analog audio output module 240 may be coupled to the backplane 210 via a number of connections, for example a digital audio connection 241, and data connections 242, 243, for example an Inter-Integrated Circuit (I2C) connection and a Serial Peripheral Interface SPI connection. Digital audio may be passed to an audio DSP card 245. The audio DSP card 245 may be, for example, a model DAE-7 card available from Momentum Data Systems. Outputs of the audio DSP card 245 may be provided to analog outputs 247, for example to a number of analog RCA connectors. The analog audio output module 240 may be configured by software to support a variety of surround sound schemes. For example, the analog outputs may be configured as two separate 7.1 surround sound zones. Alternate configurations include two separate 5.1 surround sound zones and four stereo zones, one 7.1 surround sound zone and four stereo zones, eight stereo zones, or other configurations. Such outputs may be coupled to external devices, for example to the audio amplifier 190 and/or other devices.

The UVX module 350 may accept a plurality of different graphics signals from the media server/controller 110 and may convert and extend these signals to drive a plurality of touch screen units 300, or other type of display and/or interface devices. Similarly, the UVX module 350 may pass data and audio signals between the media server/controller 110 and the plurality of touch screen units 300 or other devices coupled to the UVX 200, as well as pass data and audio signals back from these devices to the media server/controller 110.

The UVX module may be coupled to the backplane 210 via a number of graphics connections 251, for example DB-15 connections, and data connections 252, 253, such as a USB connection and an I2C connection. The USB connection may pass USB control and audio signals, and the I2C connection other control data, for example, extended display identification data (EDID), which may be stored in an EDID buffer 255 accessible through a switch 254. Each graphics signal may be passed to a receiver/amplifier 256, which may include a single-ended-to-differential twisted pair driver. In this manner, the graphics signals may be converted and extended so that they may be propagated over a longer distance than typically possible.

Data signals received from the server/controller 110 may be passed to a hub 257 coupled to a number of interconnect pathways that lead to signal extenders 258, for example USB extenders. In this manner, the signals may be amplified for transmission over longer distances than typically possible. Each of the amplified graphics signals is passed with a corresponding data signal on a universal transmission path 130.

Figure 3:
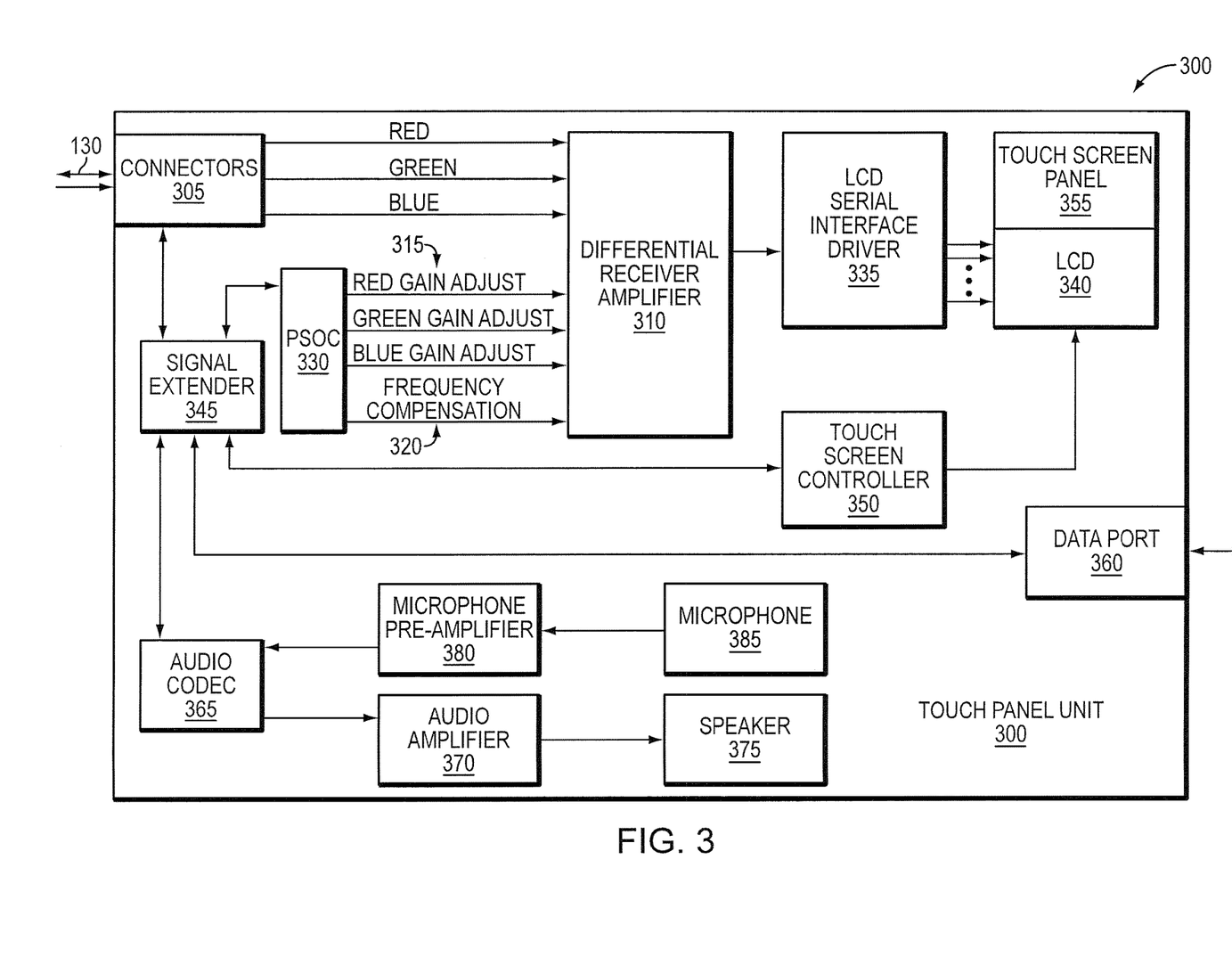
FIG. 3 is a block diagram of an example touch screen unit that may be used in the architecture of FIG. 1.

FIG. 3 is a block diagram of an example touch screen unit 300 that may be used in the architecture of FIG. 1. The touch screen unit 300 may receive a graphics signal, and both receive and transmit data signals along a universal transmission path 130 via connectors 305. As discussed above, the graphics signals may represent a user interface to be displayed to a user. The data signals may include control commands from the media server/controller 110, indications of user selections from the touch panel unit 300, as well as audio streams, for example, music or sound effects to be played by a touch panel unit 300, or passed along to a downstream device for playback. Further, the audio streams may include audio originating at a touch panel unit 300, for example, audio received/recorded at the touch panel unit 300 from a user that is to be passed back to the media server/controller 110 or another device.

The graphics signal may be passed to a differential receiver amplifier 310 that may amplify the signal in response to color gain adjustments 315 and frequency compensations 320 supplied by a programmable system-on-chip (PSOC) 330. The amplified graphics signal is then passed to a LCD serial interface driver 335 and onto a LCD display 340, for presentation to a user.

Likewise, control and/or audio data may be passed through a signal extender 345, for example a USB extender. The signal extender 345 may be coupled to the PSOC 330, as well as to a touch screen controller 350. The touch screen controller 350 may be coupled to a touch screen panel 355, which is overlaid on the LCD display 340. The touch screen panel 355 may be a resistive touch sensing system, a capacitive touch sensing system, a surface acoustic wave touch sensing system, or other type of touch sensing system. When touched by a user, the touch screen panel 355 generates x-axis and y-axis coordinates corresponding to the location of the touch. The x-axis and y-axis coordinates are passed to the touch screen controller 350 and eventually to the universal transmission path 130 and back to the media server/controller 110.

The signal extender 345 may further be coupled to an external data port 360, for example a USB port, to allow connection of external peripherals, for example a keyboard or other device. Further, audio may be passed from the signal extender 345 to an audio codec 365, for example a USB audio codec, that converts the audio into an analog audio format. The audio may thereafter be passed to an audio amplifier 370 and on to a speaker 375 for playback. Similarly, the touch panel unit 300 may include a microphone 385 that may pass received audio to a microphone preamplifier 380 and eventually to the universal transmission path 130 and back to the media server/controller 110 or another device. Audio received on the microphone 385 may be used for voice activated control, telephony applications, or a variety of other purposes.

Figure 4A:
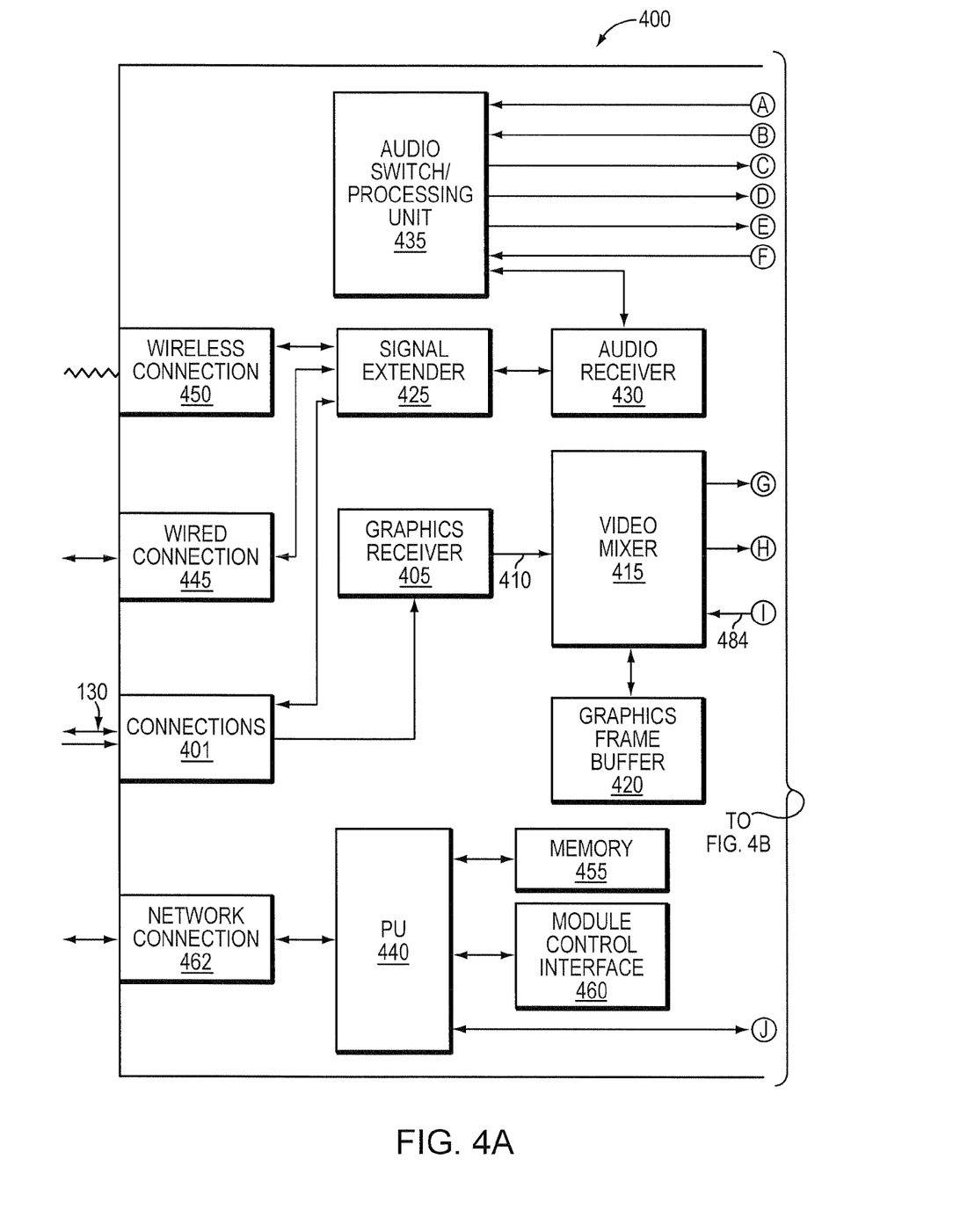
FIGS. 4A and 4B are together a block diagram of an example on-screen display (OSD) processing unit that may be used in the architecture of FIG. 1.
Figure 4B:
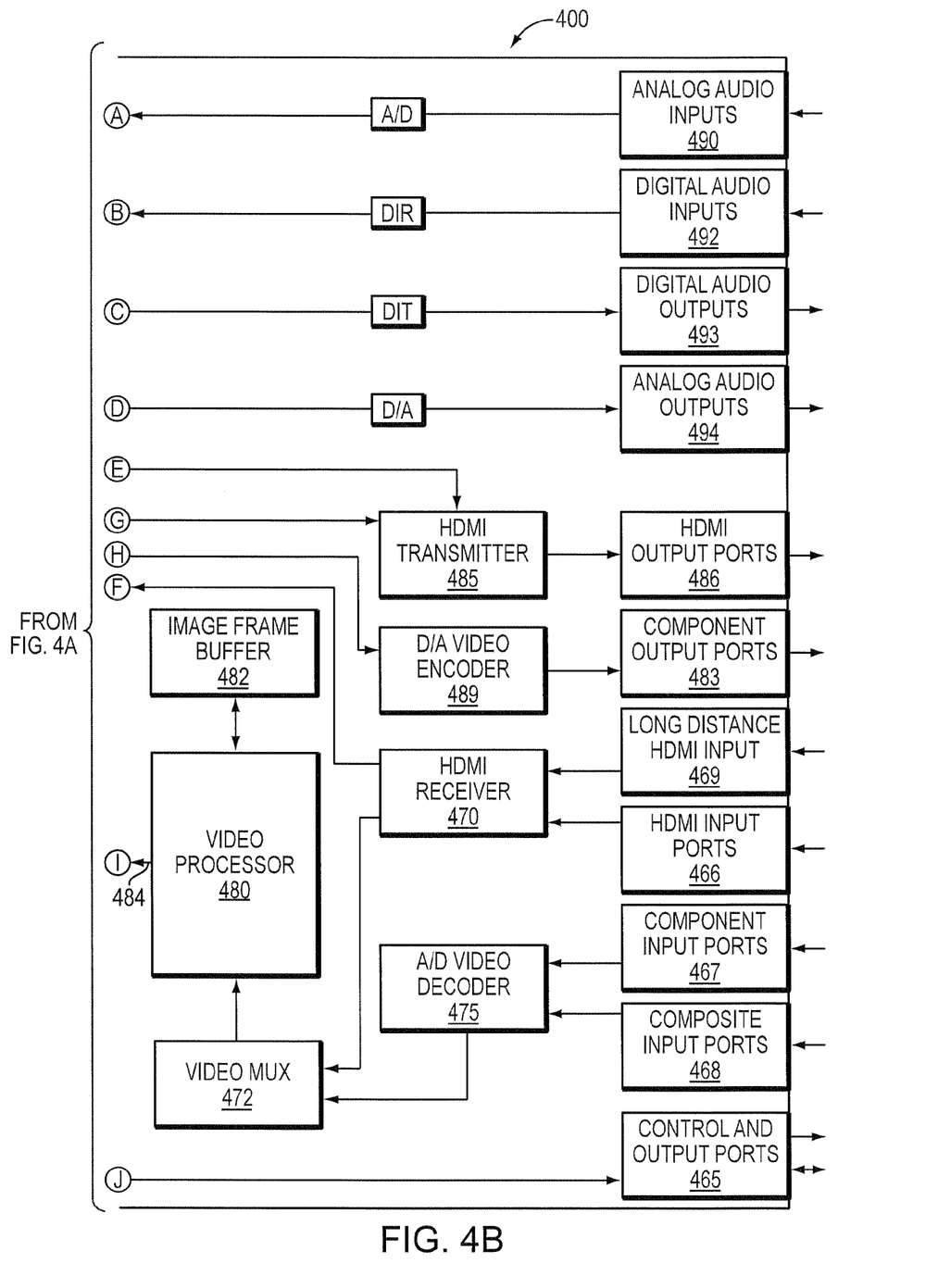

FIGS. 4A and 4b are together a block diagram of an example OSD processing unit 400 that may be used in the architecture of FIG. 1. The OSD processing unit 400 may combine graphics signals including OSD graphics with a full-motion video signal, to overlay an OSD onto the frames of the video signal. The OSD processing unit 400 may receive the graphics signal from the media server/controller 110 at connections 401 and pass the signal to a graphics receiver 405. The graphics receiver 405 may reformat and convert the graphics signal, for example, may convert the graphics to a Red-Green-Blue (RGB) color space. After conversion, the graphics are passed along a graphics link 410 to a video mixer 415. As discussed further below, the video mixer 415 may be used as part of a novel OSD overlay technique.

The OSD processing unit 400 may also receive a data signal originating from the media server/controller 110 or another device. As discussed above, the data signal may include control information, as well as one or more audio streams. Control information may be passed to a processing unit (PU) 440 and/or to a number of external outputs, for example, to a wired connection 445 and a wireless connection 450. Audio may be passed through a signal extender 425, for example, a USB signal extender, to an audio receiver 430, for example, a USB audio receiver, that converts the audio to a pulse code modulated (PCM) format. Thereafter, the audio may be passed to an audio switch/processing unit 435. As described in more detail below, the audio switch/processing unit 435 may mix the audio with other audio received on one or more other inputs, as part of an audio mixing technique.

The PU 440 of the OSD processing unit 400 may be coupled to one or more memory modules 455, for example, dynamic random access memory (DRAM) modules. The PU 440 may also be coupled to a module control interface 460, which allows the PU 440 to control the various components of the OSD processing unit 400. In addition, the PU 440 may be coupled to a network connection 462, for example, an Ethernet connection, as well as to a number of control and output ports 465, for example, wireless ports, such as IR ports, wired ports, general-purpose input/output (GPIO) ports, relay ports, serial ports, and/or a variety of other types of ports.

The OSD processing unit 400 may receive a video signal from a local video source, for example, a nearby cable box 148 (FIG. 1), DVD player 146 (FIG. 1), A/V receiver, digital video recorder (DVR), programmable multimedia controller, or other video source coupled to the OSD processing unit 400. The OSD processing unit 400 may include a wide variety of ports to permit connection with differing types of devices. For example, digital connections such as High-Definition Multimedia Interface (HDMI) audio/video input ports 466 may be provided. Such ports may be coupled to an HDMI receiver 470 that passes the audio component of HDMI signals to the audio switch/processing unit 435, and passes the video component to a video multiplexer 472. Further, a variety of analog ports may be provided, for example, component video input ports 467 and composite video input ports 468. Analog video signals may be passed to an analog to digital (A/D) video decoder 475. The A/D video decoder 475 converts analog video image data to digital video image data that may be passed to the video multiplexer 472.

Similarly, the OSD processing unit 400 may receive a video signal from a remote video source, for example, a distant cable box, DVD player, A/V receiver, DVR, or programmable multimedia controller 150 (FIG. 1). Such a video signal may be received on a long distance transmission path, for example an HDMI over CAT5 path coupled to a long distance HDMI interface port 469.

At the heart of the OSD processing unit is a video processor 480. The video processor 480, in one configuration, is a single-chip dual-channel image processor. The video processor 480 receives video image data originating from external video sources attached to input ports 466-469 through the video multiplexer 472. The video processor 480 may perform a variety of scaling, de-interlacing, noise reduction, detail enhancement, brightness control, contrast control, color control and/or other types of processing upon each video image in the video image data. Video images may be temporarily stored in an image frame buffer 482, such as a double data rate (DDR) synchronous dynamic random access memory (SDRAM). These video images are then passed to the video mixer 415 along a video image link 484.

The video mixer 415 may be a programmable logic device (PLD), for example a field programmable gate array (FPGA), yet alternately may be a purpose-built chip, such as an application specific integrated circuit (ASIC). A graphics frame buffer 420, such as a double data rate (DDR) synchronous dynamic random access memory (SDRAM), interconnected to the video mixer 415, may provide temporary storage of graphics images.

The video mixer 415 may implement a novel technique for mixing graphics, for example graphics that include an OSD received from the media server/controller 110 or another device, with video images, for example video images originating from an external video source coupled to ports 466-469. The novel technique permits a wide variety of different types of graphics (including computer graphics, text, full-motion video, still images, or other types of high quality visual data) to be mixed with images of a video data signal, in any desired region, the region chosen on a pixel-by-pixel (or near pixel-by-pixel) basis. Further, the locations of the graphics may be dynamically changed on an image-by-image basis, readily permitting the movement of the graphics about a display screen, or permitting other "special effects."

The novel technique may look to keying information incorporated into the graphics, to determine where the graphics should be displayed and where the video images should be displayed. The individual graphics frames of the graphics are preferably scaled (by the source of the graphics) to match the video processor's output resolution. Each pixel in a particular graphics frame of the graphics is preferably arranged to correspond with a pixel in a corresponding video image. The source of the graphics, for example, the media server/control 110 or another device, sets the color value of pixels in each graphics frame according to a keying scheme, to designate regions where pixels of the video image should be displayed, and regions where pixels of the graphics frame should be displayed. Specifically, where the video image is desired to be displayed, pixel color values are changed to one or more predetermined color values.

Figure 5:
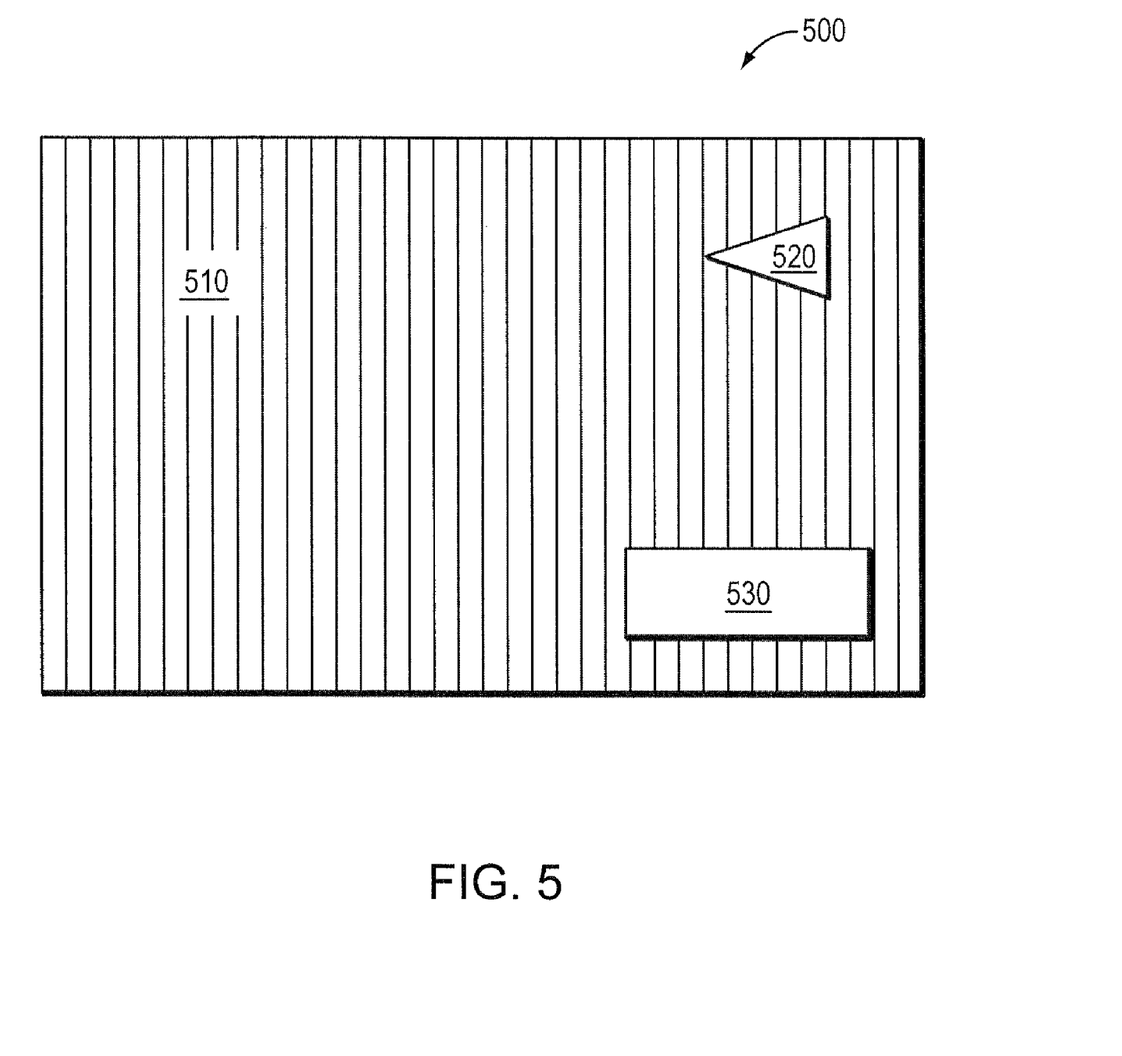
FIG. 5 is a diagram of an example graphics frame with pixels of a "background" region changed to have one or more predetermined color values for use with a color keying technique.

For example, referring to FIG. 5, which is a diagram of an example graphics frame 500, the pixels of a "background" region 510 are changed to have one or more predetermined color values, to designate that pixels of the video signal should be displayed in this region. The color values of the pixels in the remaining regions, specifically the two other graphics regions 520, 530, are not changed to the one or more predetermined color values, and simply represent actual graphics pixels, i.e., the graphics to be displayed to a user. Circuitry of the video mixer recognizes pixels that are changed to the one or more predetermined color values, and mixes the graphics and the video images in response. In this manner, a mixed image is created.

In an embodiment, where the graphics are represented in the RGB color space with 24-bit color depth, the one or more predetermined color values may take the form of one or more 8-bit Red, 8-bit Green, and 8-bit Blue values for each pixel. In one configuration, a predetermined single color value may be used, for example, a color value of Red=0, Green=96, and Blue=0 for all pixels where video image pixels are to be displayed. The predetermined single color value may be chosen as a color that occurs "naturally" at a lower than average frequency in typical graphics. Generally, due to the large number of colors that may be represented with commonly used color depths, any "natural" occurrence of pixels having the predetermined single color value will be relatively rare, and unnoticeable in full-motion video.

In another configuration, a pattern of predetermined color values occurring in nearby pixels may be used, rather than a single predetermined color value. For example, a two-color repeating pattern may be employed, where the color values of horizontally adjacent pixels in a graphics frame are caused to alternate between different predetermined colors, to designate a region where video image pixels are to be displayed. In such a two-color repeating pattern, even numbered pixels may be changed, for example, to a first predetermined color value of Red=0, Green=96, and Blue=0, while odd numbered pixel may be changed, for example, to a second predetermined color value of Red=96, Green=0, and Blue=96. To detect the pattern, the video mixer 415 performs a comparison on a number of pixels in the graphics frame. For example, for the two-color repeating pattern discussed above, the video mixer 415 may compare three adjacent pixels at a time, looking for a pixel of color Red=0, Green=96, and Blue=0, followed by a pixel of color Red=96, Green=0, and Blue=96, followed by another pixel of color Red=0, Green=96, and Blue=0. If the video mixer 415 determines such a three-pixel pattern is present, it then mixes the graphics and the video images, so that video image pixels are shown where the three-pixel pattern is present.

A wide number of variations and enhancement may be made to this basic technique. Various of these variations and enhancements are described in U.S. patent application Ser. No. 11/687,511 which was above incorporated by reference.

With reference to FIGS. 4A and 4B, the combined OSD graphics and video may be passed to a HDMI transmitter 485, for output on one or more output ports HDMI Audio/Video output ports 486, may be passed to a D/A video encoder 489 for output on one or more component output ports 483, or may be passed to some other output. The signals may then be passed, for example, to a display 140 (FIG. 1), an A/V receiver, a DVR, or another type of device. In this manner a high-quality OSD may be provided to user.

In some applications, it is desirable to also provide appropriate sound effects and/or other audio to accompany an OSD. The OSD processing unit 400 may mix audio streams to provide such functionality. As discussed above, the audio switch/processing unit 435 may receive audio originating from the media server/controller 110 or another device, delivered on the universal transmission path 130. The OSD processing unit 400 may further receive audio from one or more local audio sources, for example, via analog audio input ports 490 or digital audio input ports 492, such as TOSLINK ports and/or a Sony/Philips Digital Interface Format (S/PDIF) ports. Similarly, the OSD processing unit 400 may receive audio from one or more remote audio sources, for example via the HDMI input ports 469.

The received audio may represent the audio portion of a video presentation, for example, the audio portion of a movie or television program, or may be standalone audio, for example, a music stream. The audio switch/processing unit 435 may mix the audio received on the universal transmission path 130 with audio from a local or remote audio source, and output a combined audio signal via analog audio output ports 494, digital audio output ports 493, and/or combined audio/video output ports, such as the HDMI audio/video output ports 486. In this manner, audio may be efficiently presented to a user to accompany OSD graphics, or for other purposes.

While the above description discusses certain embodiments of the present disclosure, it should be apparent that further modifications and/or additions may be made without departing from the disclosure's intended spirit and scope. For example, while the above description discusses a single media server/controller 110 being employed, alternately a second redundant media server/controller 112 may also be used. Such a second redundant media server/controller 112 may be maintained in a standby state until a failure of the primary media server/controller 110 is detected, and in response to such detection, assume the role of the primary media server/controller 110. In this way, potentially valuable multimedia files, for example an extensive movie or music collection, may be better protected from failure of electronic hardware. Also, system downtime may be minimized.

Further, while the above description repeatedly discusses the use of LCDs in various devices, for example in the touch screen units 300, it should be understood that the descriptions are not limited to this particular display technology and may alternately be used with other display technologies. These other display technologies may include cathode ray tubes (CRTs), plasma display panels (PDP), projection displays, surface-conduction electron-emitter displays (SED), vacuum fluorescent displays (VFD), and any of a variety of other display technologies.

Further, while the above description refers to video signals originating from an external video source as full-motion video, the novel techniques are in no way limited to full-motion video. In alternate configurations, graphics including an OSD may be overlaid upon a video signal that represents a still image, for example, a photograph or artistic rendering, may be overlaid upon a video signal that represent computer graphics, for example video game graphics, a computer "desktop", or computer application graphics, or may be overlaid upon any of a variety of other types of content.

Further, while the above description refers to a variety of specific hardware units for executing various functions, it should be remembered that many of the techniques discussed herein may alternately be implemented by a variety of different hardware structures (for example a variety of different programmable logic circuits, specially-designed hardware chips, analog or partially-analog devices, and other types of devices), may be implemented in software (for example as computer-executable instructions stored in a computer-readable storage media for execution on a processor or other hardware device), or may be implemented in a combination of hardware and software. Accordingly, it should be remembered that the above descriptions are meant to be taken only by way of example.

What is claimed is:

1. A system comprising:
a media server/controller configured to generate a plurality of graphics signals, each graphics signal including a separate user interface to be displayed on a particular device of a plurality of devices, the plurality of devices including one or more touch screen units and one or more other types of devices that are not touch screen units;
a universal extender (UVX) coupled to the media server/controller, the UVX configured to receive the plurality of graphics signals, to convert and extend the graphics signals, and to pass each graphics signal to a particular device; and
each of the plurality of devices configured to receive the graphic signal passed thereto, to display graphics embodied in the graphics signals, the one or more touch screen units further configured to accept a user touch and to pass a location of the user touch back to the UVX for transmission to the media server/controller;
wherein the media server/controller is further configured to generate control commands in response to the location of the user touch and to provide the control commands.

2. The system of claim 1 wherein the one or more touch screen units lack processing capabilities to interrelate the location of the user touch with displayed content.

3. The system of claim 1 wherein the one or more touch screen units pass the location of the user touch back on the universal transmission pathway as an x-axis and a y-axis coordinate.

4. The system of claim 1 wherein the UVX is further configured to pass each graphics signal on a separate universal transmission pathway to a particular device coupled thereto.

5. The system of claim 4 wherein each universal transmission pathway comprises at least one Category 5 (CAT5) cable.

6. The system of claim 1 further comprising:
at least one bi-directional data link that couples the media server/controller and the UVX and is configured to pass control information.

7. The system of claim 6 wherein the at least one bi-directional data link is configured to pass one or more audio streams.

8. The system of claim 6 wherein the one or more touch screen units are further configured to pass an audio stream back to the UVX.

9. The system of claim 1 wherein the plurality of devices include an on-screen display (OSD) processing unit, the OSD processing unit configured to combine a graphics signal received from the media server/controller with a video signal from another source.

10. The system of claim 9 wherein the another source is a local video source.

11. The system of claim 9 wherein the graphics signal includes a plurality of graphics frames and at least some graphics frames include one or more regions having pixels set to one or more predetermined color values, and the video signal includes video images corresponding to the plurality of graphics frames and the OSD processing unit further comprises:
a video mixer configured to recognize pixels in each of the at least some graphics frames that are set to the one or more predetermined color values, and in the one or more regions where the pixels are set to the one or more predetermined color values to mix pixels from the corresponding video image with the graphics frame, to create a mixed image.

12. The system of claim 11, wherein the one or more predetermined color values are a pattern of predetermined color values.

13. A method comprising:
generating a plurality of graphics signals at a media server/controller, each graphics signal including a separate user interface to be displayed on a particular device of a plurality of devices, the plurality of devices including one or more touch screen units and one or more other types of devices that are not touch screen units;
passing each graphics signal to a particular device;
displaying graphics embodied in the graphics signals at each of the plurality of devices, and, for each of the devices that is a touch screen unit,
accepting a user touch, and
passing a location of the user touch back to the media server/controller; and
generating control commands at the media server/controller in response to the location of the user touch and providing the control commands.

14. The method of claim 13 wherein the one or more touch screen units lack processing capabilities to interrelate the location of the user touch with displayed content.

15. The method of claim 13 wherein the one or more touch screen units pass the location of the user touch as an x-axis and a y-axis coordinate.

16. The method of claim 13 further comprising:
converting and extending the graphics signals before passing them to the plurality of devices.

17. The method of claim 13 wherein the step of passing further comprises:
transmitting a graphics signal on a universal transmission pathway that includes at least one Category 5 (CAT5) cable.

18. The method of claim 13 further comprising:
passing an audio stream from the media server/controller to at least one of the plurality of devices.

19. The method of claim 13 further comprising:
passing an audio stream from at least one of the touch screen units to the media server/controller.

20. The method of claim 13 wherein the plurality of devices include an on-screen display (OSD) processing unit, and the OSD processing unit,
combining a graphics signal from the media server/controller with a video signal from another source.

21. The method of claim 20 wherein the another source is a local video source.

22. The method of claim 20 wherein the graphics signal includes a plurality of graphics frames and at least some graphics frames include one or more regions having pixels set to one or more predetermined color values, and the video signal includes video images corresponding to the plurality of graphics frames and the OSD processing unit,
recognizing pixels in each of the at least some graphics frames that are set to the one or more predetermined color values; and
mixing, in the one or more regions where the pixels are set to the one or more predetermined color values, pixels from the corresponding video image with the graphics frame, to create a mixed image.

23. The method of claim 22, wherein the one or more predetermined color values is a pattern of predetermined color values.

24. A system comprising:
means for generating a plurality of graphics signals, each graphics signal including a separate user interface to be displayed on a particular device of a plurality of devices, the plurality of devices including one or more touch screen units and one or more other types of devices that are not touch screen units;
means for passing each graphics signal to a particular device;
means for displaying graphics embodied in the graphics signals at each of the plurality of devices, and, at each of the devices that is a touch screen unit,
means for accepting a user touch, and
means for passing a location of the user touch back to the media server/controller; and
means for generating control commands in response to the location of the user touch and providing the control commands.

* * * * *